United States Patent
Rafferty et al.

(10) Patent No.: US 11,463,391 B2
(45) Date of Patent: Oct. 4, 2022

(54) SYSTEMS AND METHODS FOR PROCESSING USER CONCENTRATION LEVELS FOR WORKFLOW MANAGEMENT

(71) Applicant: Capital One Services, LLC, McLean, VA (US)

(72) Inventors: Galen Rafferty, Mahomet, IL (US); Jeremy Goodsitt, Champaign, IL (US); Austin Walters, Savoy, IL (US); Ernest Kwak, Urbana, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/824,852

(22) Filed: Mar. 20, 2020

(65) Prior Publication Data

US 2021/0297376 A1    Sep. 23, 2021

(51) Int. Cl.
*H04L 51/212* (2022.01)
*G06N 3/04* (2006.01)
*G06N 3/08* (2006.01)
*G06F 16/28* (2019.01)

(52) U.S. Cl.
CPC .......... *H04L 51/212* (2022.05); *G06F 16/285* (2019.01); *G06N 3/04* (2013.01); *G06N 3/08* (2013.01)

(58) Field of Classification Search
CPC ... G06Q 10/063112; G06Q 10/063114; G06Q 10/063116; G06Q 10/06316; G06Q 10/0639; H04L 51/12; H04L 51/212; G06F 16/285; G06N 3/04; G06N 3/08; G06N 3/0445; G06N 3/0472; G06N 5/003; G06N 20/10; G06N 20/20; G06N 3/0454
See application file for complete search history.

(56) References Cited

U.S. PATENT DOCUMENTS

| | | | |
|---|---|---|---|
| 10,877,444 B1* | 12/2020 | Roach | A61B 5/168 |
| 10,902,705 B1* | 1/2021 | Rose | H04W 12/72 |
| 10,938,641 B1* | 3/2021 | Fritz | H04L 41/0806 |
| 2013/0006064 A1* | 1/2013 | Reiner | A61B 5/0022 600/300 |
| 2015/0120845 A1* | 4/2015 | McClard | H04L 51/24 709/206 |
| 2015/0237834 A1* | 8/2015 | Schab | A61B 5/746 340/573.3 |
| 2015/0356462 A1* | 12/2015 | Fawaz | G06N 20/00 706/12 |

(Continued)

*Primary Examiner* — Ninos Donabed
(74) *Attorney, Agent, or Firm* — Finnegan, Henderson, Farabow, Garret & Dunner, L.L.P.

(57) ABSTRACT

Systems and methods for processing user data are disclosed. A system may include a memory storing instructions and at least one processor configured to execute the instructions to perform operations. The operations may include receiving, from a sensor, first user data associated with a client device; receiving, from a filter model, feature data corresponding to the first user data, the feature data comprising at least one of workflow information, system messages, or email addresses; training a meta-model to predict the first user data based on the feature data; generating a meta-model output based on the filter model and the feature data; updating the filter model based on the meta-model output; and transmitting the updated filter model to the client device.

18 Claims, 5 Drawing Sheets

(56) References Cited

U.S. PATENT DOCUMENTS

| | | | |
|---|---|---|---|
| 2016/0300392 A1* | 10/2016 | Jonczyk | G06T 7/536 |
| 2016/0350655 A1* | 12/2016 | Weiss | G06F 40/35 |
| 2018/0032944 A1* | 2/2018 | Sarvana | G06Q 10/063114 |
| 2018/0168515 A1* | 6/2018 | Farahmand | A61B 5/7267 |
| 2018/0253659 A1* | 9/2018 | Lee | H04L 51/02 |
| 2018/0263220 A1* | 9/2018 | Schab | G08B 25/10 |
| 2018/0349517 A1* | 12/2018 | Kleiman-Weiner | G06F 16/904 |
| 2019/0317605 A1* | 10/2019 | Dobson | G06N 20/00 |
| 2019/0348041 A1* | 11/2019 | Celia | G10L 15/16 |
| 2020/0118340 A1* | 4/2020 | Rammos | G06N 20/00 |
| 2020/0401912 A1* | 12/2020 | Sert | G06N 5/04 |

\* cited by examiner

SYSTEMS AND METHODS FOR PROCESSING USER CONCENTRATION LEVELS FOR WORKFLOW MANAGEMENT

TECHNICAL FIELD

The present disclosure relates generally to systems and methods for processing user data, and more particularly, to calibrating user concentration levels by applying a filtering system to manage incoming user messages and notifications.

BACKGROUND

It may be difficult for a computerized system to identify an optimal time to interrupt a user workflow in order to allow for incoming messages, such as email messages, to be transmitted to the user. As most incoming content generates a notification at the time of delivery, there typically exists little to no prioritization of the content. Thus, users may become distracted by tasks related to relatively unimportant incoming content (e.g. email tasks) that can be saved until a more opportune time (e.g. when a user is not in the middle of performing an intensive task). Distraction by the user in such a manner may limit or diminish users' overall productivity or efficiency.

Current systems may include do-not-disturb settings or other user-defined blocks on their time to help maintain worker productivity. These systems may also include automated calendar-based restrictions depending on meeting schedules which may prevent user interruption. Similarly, current systems may enable a user to close their applications completely while performing tasks that require concentration. However, such systems may still fail to prevent a user from being interrupted, while also failing to allow any high priority notifications for which the user should be interrupted, and therefore, are unable to prevent a reduction in a user or worker's overall productivity or efficiency.

Therefore, what is needed is a filtering management system that factors in a user's task level of concentration intensiveness and then also considers and analyzes the importance of incoming content. Moreover, what is needed is a filtering management system that only delivers to the user incoming content (e.g. emails) that are important enough to warrant interrupting a user's current tasks (or a system that at least waits until the most optimal time before delivering incoming content to a user). Moreover, what is needed is a filtering system applicable to any computer-based workflow, including system messages, app messages, notifications from services like Jira, Slack, etc., incoming live messages like VOIP calls, instant messaging, so as to only deliver to the user incoming content that is deemed important.

Moreover, what is needed is a filtering management system that is aware not just of the user's tasks, but also of the level of concentration required to perform tasks. Specifically, what is needed is a filtering management system that also rates the importance of incoming content and notifications, and a filtering management system that calibrates incoming content so a user will be interrupted only by predetermined important enough tasks. As such, a filtering management system will delay other tasks for delivery until a time when the user is available based on actual concentration levels rather than arbitrary settings.

Furthermore, what is needed is a filtering management system for filtering user concentration levels by allowing a user to "opt-in" to using the filtering system to manage workflows and/or notifications, and a filtering management system that uses sensors or inputs to analyze and describe the concentration level of the user. In particular, what is needed are one or more of the following in any combination: sensors that analyze keyboard and typing cadence; computer vision to determine facial expression; eye focal targets on the screen; leverage natural language processing (NLP) to analyze the types of things being read/written by the user and classifying the importance level; CPU stats to determine machine-task intensiveness of what's being done; and also user-defined do-not-disturb statuses (such as when in meetings). Additionally, what is needed are sensors or inputs to analyze and describe the priority level of any incoming content, messages, or notifications. In particular, NLP may be useful to analyze the incoming content and classify its importance level, recency, or relationship to other inquiries/messages. Moreover, NLP may be needed to provide a determination of urgency versus importance of incoming content, and to provide a determination of the content relationship to a user (e.g. supervisory, VP+, subordinate, etc.).

Finally, what is needed is a filtering management system that both analyzes and scores the user's concentration level, analyzes and scores incoming content's importance level, and dynamically compares the user's concentration level to the incoming content's importance level to determine whether the incoming content is sufficiently important or urgent to warrant interrupting the user with an incoming message. Therefore, what is needed is a filtering management system configured to determine an optimal time to deliver incoming notifications and content to a user when the user is most receptive to receiving messages based on the intensity of their current task(s). Furthermore, what is needed are machine learning techniques that can improve the accuracy and applicability of the filtering management system over time.

The disclosed systems and methods address one or more of the problems set forth above and/or other problems in the prior art.

SUMMARY

One aspect of the present disclosure is directed to a system for processing user data. The system may include a memory storing instructions and at least one processor configured to execute the instructions to perform operations. The operations may include receiving, from a sensor, first user data associated with a client device; receiving, from a filter model, feature data corresponding to the first user data, wherein the feature data comprises at least one of workflow information, system messages, or email addresses; training a meta-model to predict the first user data based on the feature data; generating a meta-model output based on the filter model and the feature data; updating the filter model based on the meta-model output; and transmitting the updated filter model to the client device.

Another aspect of the present disclosure is directed to a method for processing user data. The method may include receiving, from a sensor, first user data associated with a client device; receiving, from a filter model, feature data corresponding to the first user data, wherein the feature data comprises at least one of workflow information, system messages, or email addresses; training a meta-model to predict the first user data based on the feature data; generating a meta-model output based on the filter model and the feature data; updating the filter model based on the meta-model output; and transmitting the updated filter model to the client device.

Yet another aspect of the present disclosure is directed to a non-transitory computer-readable medium storing instructions that, when executed by a processor, cause the processor to perform operations for processing user data. The operations may include receiving, from a sensor, first user data associated with a client device; receiving, from a filter model, feature data corresponding to the first user data, wherein the feature data comprises at least one of workflow information, system messages, or email addresses; training a meta-model to predict the first user data based on the feature data; generating a meta-model output based on the filter model and the feature data; updating the filter model based on the meta-model output; and transmitting the updated filter model to the client device.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
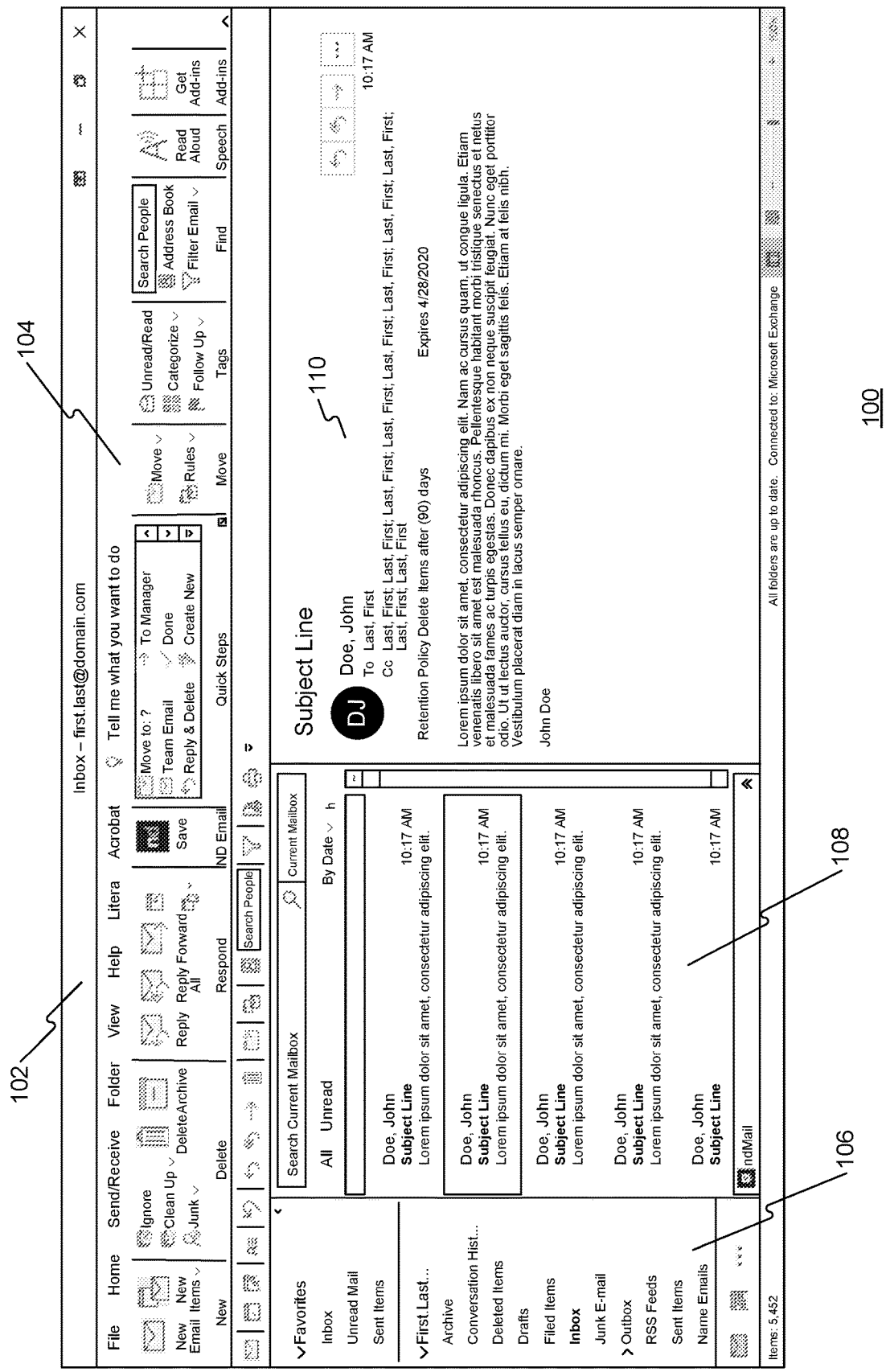
FIG. 1 illustrates a graphical user interface (GUI) output of an existing method for processing user data.

FIG. 1 illustrates a graphical user interface (GUI) output 100 of an existing method for processing user data. As shown in FIG. 1, output 100 may be representative of an inbox 102. Inbox 102 includes a horizontal toolbar 104 placed at the top of inbox 102 and may include multiple menu drop-down items and multiple buttons to allow for user interaction and management of incoming email content. Inbox 102 may also include a left menu panel 106 with several folders storing email messages and email content. For example, as shown in FIG. 1, left menu panel 106 may include an "Inbox," "Sent Items," "Drafts," and an "Outbox," among other folders that may store email messages. Inbox 102 may also include a central menu panel 108 that includes a list of incoming emails prioritized by "Date," "Subject," or by other categories or subcategories (not shown). Inbox 102 may include a right menu panel 110 that includes specific email content corresponding to a user selection of email from central menu panel 108. The specific email content may include a subject line, email addresses, timestamp, and email content, among other email and user data. A user may interact with each of horizontal toolbar 104, left menu panel 106, central menu panel 108, and right menu panel 110 to adjust and configure incoming email messages and related email content.

In the example of FIG. 1, a filter management system (as discussed below) may train a filter model using training data (e.g., using stored email messages or received email messages from a server) and may provide the trained filter model to update a graphical user interface (GUI) output 100 and one or more remote devices. The filter model may include a convolutional neural network and/or another machine-learning model. Email messages may be captured and/or stored on a remote device (e.g., a user may receive in an email message at graphical user interface (GUI) output 100 displayed using a smartphone or other mobile computing device). An instance of the filter model running on a remote device may filter email messages into one or more conventional categories such as "Inbox," "Sent Items," "Drafts," and an "Outbox," or other classification categories or subcategories (e.g. based on a relationship to a user or based on urgency or importance levels). In some embodiments, a remote device may also provide a success or failure message associated with the filter result to a filter management system, as discussed in FIG. 2 below. While inbox 102 is shown in FIG. 1 as handling email messages, filter management system (as discussed below) may be configured to any computer-based workflow, including system messages, application messages, notifications from services like Jira, Slack, etc., incoming live messages like VOIP calls, instant messaging, and other types of messages, consistent with this disclosure.

Figure 2:
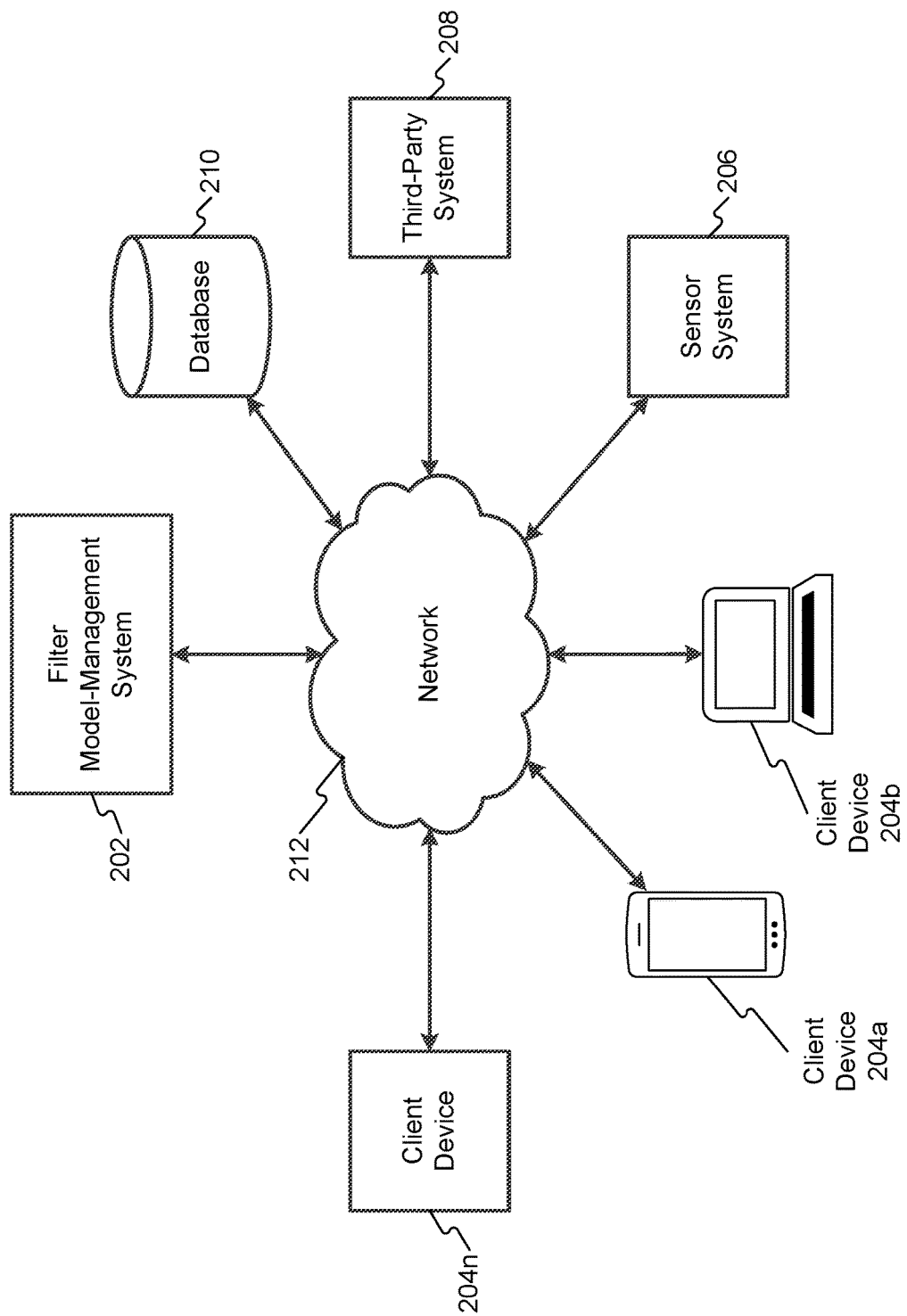
FIG. 2 is a block diagram of an exemplary system for managing filter models, consistent with disclosed embodiments.

FIG. 2 is a block diagram of exemplary system 200 for managing filter models, consistent with disclosed embodiments. As shown, system 200 may include a filter model-management system 202, one or more client devices 204a, 204b,-204n, a sensor system 206, a third-party system 208, and a database 210. As shown in FIG. 2, components of system 200 may be connected to each other via a network 212.

In some embodiments, aspects of system 200 may be implemented on one or more cloud services designed to generate ("spin-up") one or more ephemeral container instances in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances do not permit unauthorized access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 200 can be arranged in various ways and implemented with any suitable combination of hardware, firmware, and/or software, as applicable. For example, in some embodiments, system 200 may include a larger or smaller number of model-management systems, client devices, sensor systems, third-party systems, and/or databases. In addition, system 200 may further include other components or devices not depicted that perform or assist in the performance of one or more processes, consistent with the disclosed embodiments. The exemplary components and arrangements shown in FIG. 2 are not intended to limit the disclosed embodiments.

Filter model-management system 202 may include a computing device, a computer, a server, a server cluster, a plurality of server clusters, and/or a cloud service, consistent with disclosed embodiments. Model-management system 202 may include one or more memory units and one or more processors configured to perform operations consistent with disclosed embodiments. Model-management system 202 may include computing systems configured to generate, receive, retrieve, store, and/or provide models and/or data, consistent with disclosed embodiments.

Filter model-management system 202 may include computing systems configured to generate and train models, consistent with disclosed embodiments. Filter model-management system 202 may be configured to receive data from, and/or transmit data to other components of system 200 and/or computing components outside system 200 (e.g., via network 212). Filter model-management system 202 is disclosed in greater detail below (in reference to FIG. 4).

Client devices 204a, 204b,-204n may include one or more memory units and one or more processors configured to perform operations consistent with disclosed embodiments. In some embodiments, client devices 204a, 204b,-204n may include hardware, software, and/or firmware modules. Client devices 204a, 204b,-204n may be user devices such as mobile devices, tablets, personal computers, terminals, kiosks, servers, server clusters, cloud services, storage devices, specialized devices configured to perform methods according to disclosed embodiments, or the like.

Client devices 204a, 204b,-204n may also include interfaces configured to receive information from and/or provide information to a user and may be connected to displays, touch screens, keypads, speakers, microphones, sensors, scanners, mice, trackpads, cameras, buttons, dials, knobs, switches, haptic feedback devices, light emitting components, and other input and/or output devices. Client devices 204a, 204b,-204n may also include sensors, such as temperature sensors, light sensors, motion sensors, accelerometers, magnetometers, gyroscopes, temperature sensors, moisture sensors, and/or other types of sensors. Client devices 204a, 204b,-204n may further include components to connect to a network and/or another device, and a transceiver. Client devices 204a, 204b,-204n may be configured to connect to a network and/or another device via a wired connection, a short-range wireless connection, a BLUETOOTH connection, a WIFI connection, a radio connection, a near-field connection, or any other connection.

Sensor system 206 may include one or more sensors, including those described herein and/or any other sensors, and may be configured to manage sensor data (e.g., collect, store, retrieve, and/or share sensor data). Sensor system 206 may further include computing devices, computers, servers, server clusters, and/or cloud services, consistent with disclosed embodiments. Sensor system 206 may also include one or more memory units and one or more processors configured to perform operations consistent with disclosed embodiments and/or computing systems configured to generate, receive, retrieve, store, and/or provide data, consistent with disclosed embodiments.

Sensor system 206 may be configured to manage environmental data, climate data, and/or weather data, and may be further configured to manage data associated with one or more internet-of-things (IoT) devices. Sensor system 206 may also be configured to collect, store, retrieve, and/or transmit data based on an identifier and/or a data characteristic. For example, sensor system 206 may be configured to transmit data associated with a location, a time, a user, and/or the like.

Sensor system 206 may be configured to analyze the concentration level of a user. For example, sensory system 206 may analyze keyboard and typing cadence, facial expression, and eye focal targets on the screen. Sensor system 206 may leverage natural language processing (NLP) to analyze the types of content being read/written by a user and may classify a corresponding importance level. Sensor system 206 may analyze CPU statistics to determine machine-task intensiveness of operations being performed, and may analyze user-defined do-not-disturb statuses (such as when a user is in meetings). Additionally, sensor system 206 may analyze and describe the priority level of any incoming email content, messages, application messages, notifications from services, VOIP call messages, or instant messages. In particular, sensor system 206 may use NLP to analyze the incoming content and classify its importance level, recency, or relationship to other inquiries/messages. Moreover, sensor system 206 may use NLP to provide a determination of urgency versus importance of incoming email or message content, and to provide a determination of the incoming content relationship to a user (e.g. supervisory, VP+, subordinate, or other relationship type).

Third-party system 208 may be configured to manage data (e.g., collect, store, retrieve, and/or share data, and may include computers, servers, server clusters, and/or cloud services, consistent with disclosed embodiments. Third-party system 208 may further include one or more memory units and one or more processors configured to perform operations consistent with disclosed embodiments, as well as computing systems configured to generate, receive, retrieve, store, and/or provide data, consistent with disclosed embodiments.

In some embodiments, third-party system 208 may include websites, databases, sockets, subscription-based services, and/or other data provisioning services. For example, third-party system 208 may include weather-reporting systems, location-tracking systems, social media systems, email systems, text messaging systems, and/or any other systems. As an illustrative example, third-party system 208 may be configured to provide email or advertising data associated with a particular company (e.g., an online advertising company). Third-party system 208 may also be configured to provide email data, social media data, messaging data, transaction data, sleep data, health data, location data, and/or any other kind of data or metadata.

Database 210 may include one or more databases configured to store data for use by system 200, consistent with disclosed embodiments. In some embodiments, database may be configured to store data such as training data, environmental data, filtering or classification data, and/or other data, consistent with disclosed embodiments. Database 210 may include a cloud-based database (e.g., Amazon Web Services Relational Database) or an on-premises database. Database 210 may include training data, model data (e.g., model parameters, training criteria, performance metrics, etc.), and/or other data, consistent with disclosed embodiments. Database 210 may include data received from one or more components of system 200 and/or computing components outside system 200 (e.g., via network 212). In some embodiments, database 210 may be a component of filtering model-management system 202.

At least one of model-management system 202, client devices 204a, 204b,-204n, sensor system 210, third-party system 208, and/or database 210 may be connected to network 212. Network 212 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 212 may be connected to other networks (not depicted in FIG. 2) to connect the various system components to each other and/or to external systems or devices. In some embodiments, network 212 may be a secure network and require a password to access the network.

Figure 3:
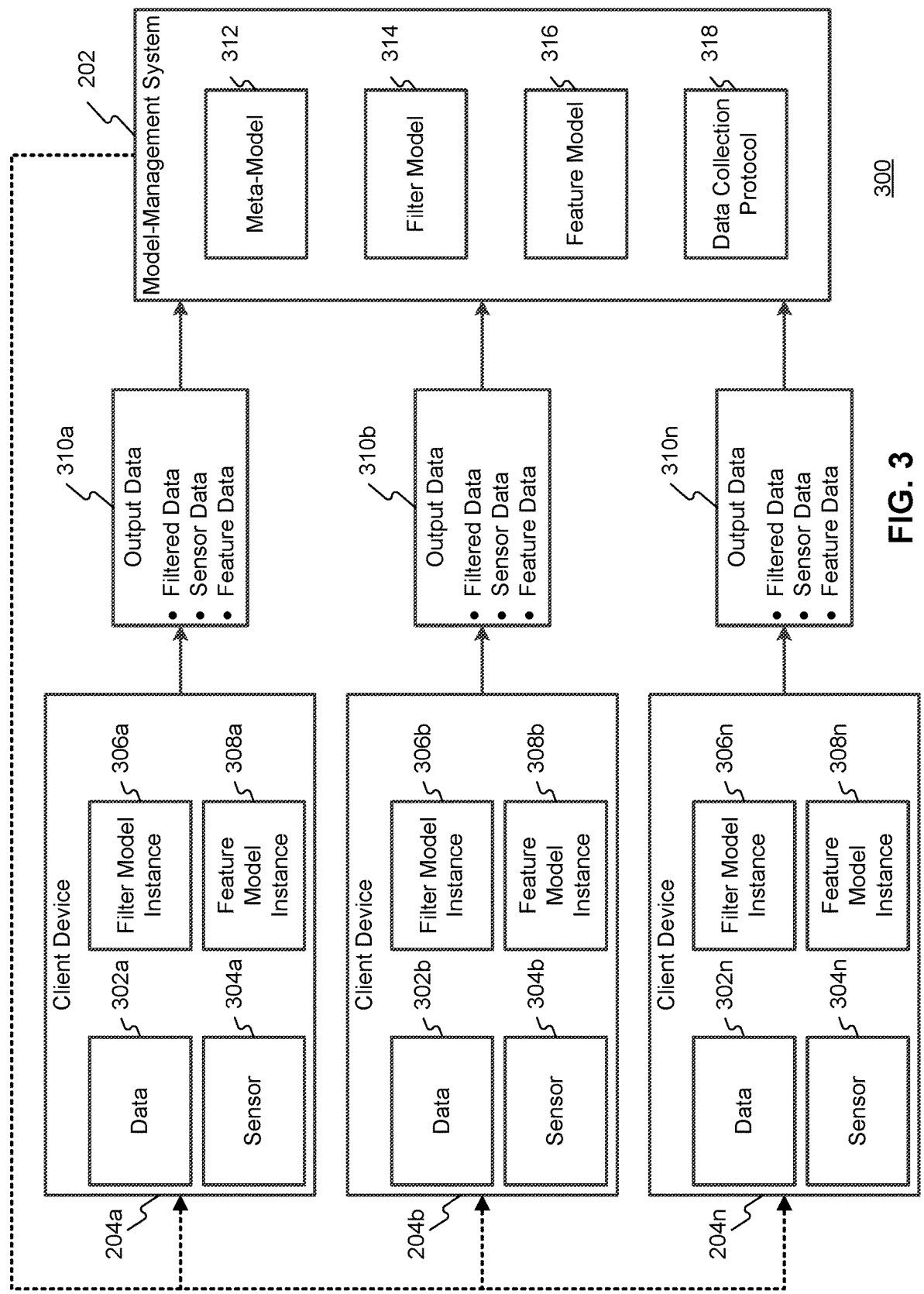
FIG. 3 is a block diagram of an exemplary system for using a meta-model to improve data filtering, consistent with disclosed embodiments.

FIG. 3 is a block diagram of an exemplary system 300 for using a meta-model to improve data filtering and classification, consistent with disclosed embodiments. As compared to conventional systems, system 300 may produce more accurate filtering and classification results with greater efficiency. As described in greater detail below, without access to data used to generate a filtered result, a meta-model 312 may improve accuracy of a filter model by learning from data output of a filter model instance and a feature model instance. This may lead to more efficient training of a filter model. Accordingly, system 300 provides advantages by increasing accuracy, lowering costs, and reducing computing resource use.

System 300 may be an implementation of system 200 (FIG. 2). As shown, system 300 includes client devices 204a, 204,-204n; output data 310a, 310b,-310n, and filter model-management system 202 FIG. 3 is shown for purposes of illustration only, and system 300 may include more or fewer client devices, output data, and/or model-management systems.

Client devices 204a, 204,-204n may be client devices as described herein and/or any other client device; and may include data 302a, 302b,-302n, such as image data, text data, numeric data, video data, and/or any other type of data. In some embodiments, data 304a, 304b,-304n may be received via an interface of a client device (e.g., an input/output device), from network 212, from a local storage on client device 204a, from database 210, from sensor system 206, and/or from any other computing component. Client device 204a, 204b,-204n may include sensors 304a, 304b,-304n, which may include sensors as described herein or any other sensor. Client devices 204a, 204,-204n may be configured to collect data 302a, 302b,-302n based on one or more data collection protocols. Client devices may be configured to collect data 302a, 302b,-302n using sensors 304a, 304b,-304n. A client device may be configured to collect data using a sensor based on a data collection protocol.

Client devices 204a, 204b,-204n may include one or more filter model instances 306a, 306b,-306n (i.e., one or more filter models running and/or stored on a client device). Filter model instances 306a, 306b,-306n may include any type of filter model, consistent with disclosed embodiments. Filter model instances 306a, 306b,-306n may be instances of the same filter model and/or may be instances of filter models different from each other. In some embodiments, filter model instances 306a, 306b,-306n are trained and/or implemented locally on a client device to filter and/or classify data 302a, 302b,-302n. For example, filter model instances 306a, 306b,-306n may be trained to filter and/or classify email messages or other message types (as discussed above) (e.g., using email content such as those depicted in FIG. 1).

Client devices 204a, 204b,-204n may include one or more feature model instances 308a, 308b,-308n (i.e., one or more feature models running and/or stored on a client device). Feature model instances 308a, 308b,-308n may include any type of feature model, consistent with disclosed embodiments. Feature model instances 308a, 308b,-308n may be instances of the same feature model and/or may be instances of feature models different from each other. In some embodiments, feature model instances 308a, 308b,-308n are trained and/or implemented locally on a client device to identify features of data 302a, 302b,-302n. For example, feature model instances 308a, 308b,-308n may be configured to determine a statistical metric of data and/or machine-learned measure of data (e.g., neural network output based on input data). A statistical metric may include a univariate statistical metric, a multivariate statistical metric, an average, a median, a range, a correlation, a regression result, a goodness of fit, and/or any other statistical metric. For example, a feature model may be configured to generate a metric of email priority (based on, e.g., a related delivery timestamp, an email address, or a subject line) and/or determine a presence of particular content in an email. A feature model may include a statistical model, an algorithm, and/or a machine learning model.

Output data 310a, 310b,-310n may be generated and/or transmitted by client devices 204a, 204b,-204n, respectively. Output data may include filtered data, sensor data, and/or feature data. Filtered data may include a filter model output and/or a filtered result, consistent with disclosed embodiments. Feature data may include a feature model output. Feature model output may include a measure of a data feature, a statistical metric, an indicator of a presence of a detected email content, a metric associated with an email subject factors, and/or any other data based on a feature of a data sample, consistent with disclosed embodiments. Sensor data may include email data, alphanumeric data, internet protocol (IP) address data, time data, location data, and/or any other sensor data. FIG. 3 is provided for purposes of illustration, and output data may include any other kind of data, including data not depicted in FIG. 3.

As shown, client devices 204a, 204b,-204n may transmit output data to filter model-management system 202. In some embodiments, client devices 204a, 204b,-204n may not transmit data used to filter model output due to a regulation, a privacy policy, a bandwidth limitation, or any other reason.

In some embodiments, filter model-management system 202 may include a meta-model 312, a filter model 314, a feature model 316, and/or a data-collection protocol 318. Consistent with disclosed embodiments, filter model-management system 202 may include other components not depicted in FIG. 3.

Meta-model 312 may be configured to generate an updated classification model 314 and/or data-collection protocol 318 based on output data 310a, 310b,-310n. Meta-model 312 may include a neural network model, a deep-learning model, a CNN model, a long short-term memory (LSTM) model, a random forest model, and/or any other machine learning model. In some embodiments, meta-model 312 includes a regression model, a linear regression model, a logistic regression model, a polynomial regression model, a multivariate model, a stochastic model, and/or any other statistical model.

Based on feature data, filtered data, a data collection protocol, and/or additional data, meta-model 312 may determine that environmental conditions, computer usage factors, image subject factors, and/or other factors lead to filter model failures. In some embodiments, meta-model 312 or other components of filter model-management system 202 may generate an updated filter model 314 and/or data-collection protocol 318 based on feature data. In some embodiments, filter model-management system 202 may update filter model 314 based on factors associated with filter model failure. For example, filter model-management system 202 may train filter model 314 using training data that include factors that associated with filter model failure. As another example, filter model-management system 202 may include a check in a data collection protocol based on factors that are associated with filter model failure (e.g., an instruction to retake upload and filter a particular email message as shown in FIG. 1). Meta-model 312 may determine a statistical relationship and/or a machine-learned relationship between an aspect of a data collection protocol, feature data, sensor data, and/or filtered data. Accordingly, without access to data used to generate filtered results, meta-model 312 may be configured to improve accuracy of a filter model and/or change a data collection protocol to improve accuracy of filtered results.

Filter model 314 may include any filter model described herein and/or any other filter model. In some embodiments, filter model-management system 202 is configured to train filter model 314 using training data. Filter model-management system 202 may be configured to transmit filter model 314 to a client device (e.g., in response to a request, as part of an application or program, etc.). In some embodiments, filter model-management system 202 may be configured to update filter model 314 based on meta-model output.

Feature model 314 may include any feature model described herein and/or any other feature model. In some embodiments, filter model-management system 202 is configured to train feature model 314 using training data. Filter model-management system 202 may be configured to transmit feature model 314 to a client device (e.g., in response to a request, as part of an application or program, etc.). In some embodiments, filter model-management system 202 may be configured to update feature model 314 based on meta-model output.

Filter model-management system 202 may include a data collection protocol 318. A data collection protocol may include a schedule, a rate, a frequency, a location, a quantity, data size, and/or any other appropriate data collection parameter. A data collection protocol may include a command to adjust a hardware setting, change a data collection parameter, wake a computing component, or the like. A data collection protocol may include a prompt for user input and may include commands to collect data based on received user input. A data collection protocol may include a data filter (i.e., a check) to reject or accept data. A filter may be based on a feature data. For example, a feature model output may determine a metric of data quality (e.g., blurriness metric) and include a filter to reject data based on a threshold. A data collection protocol may be part of an application or other program of a client device.

Figure 4:
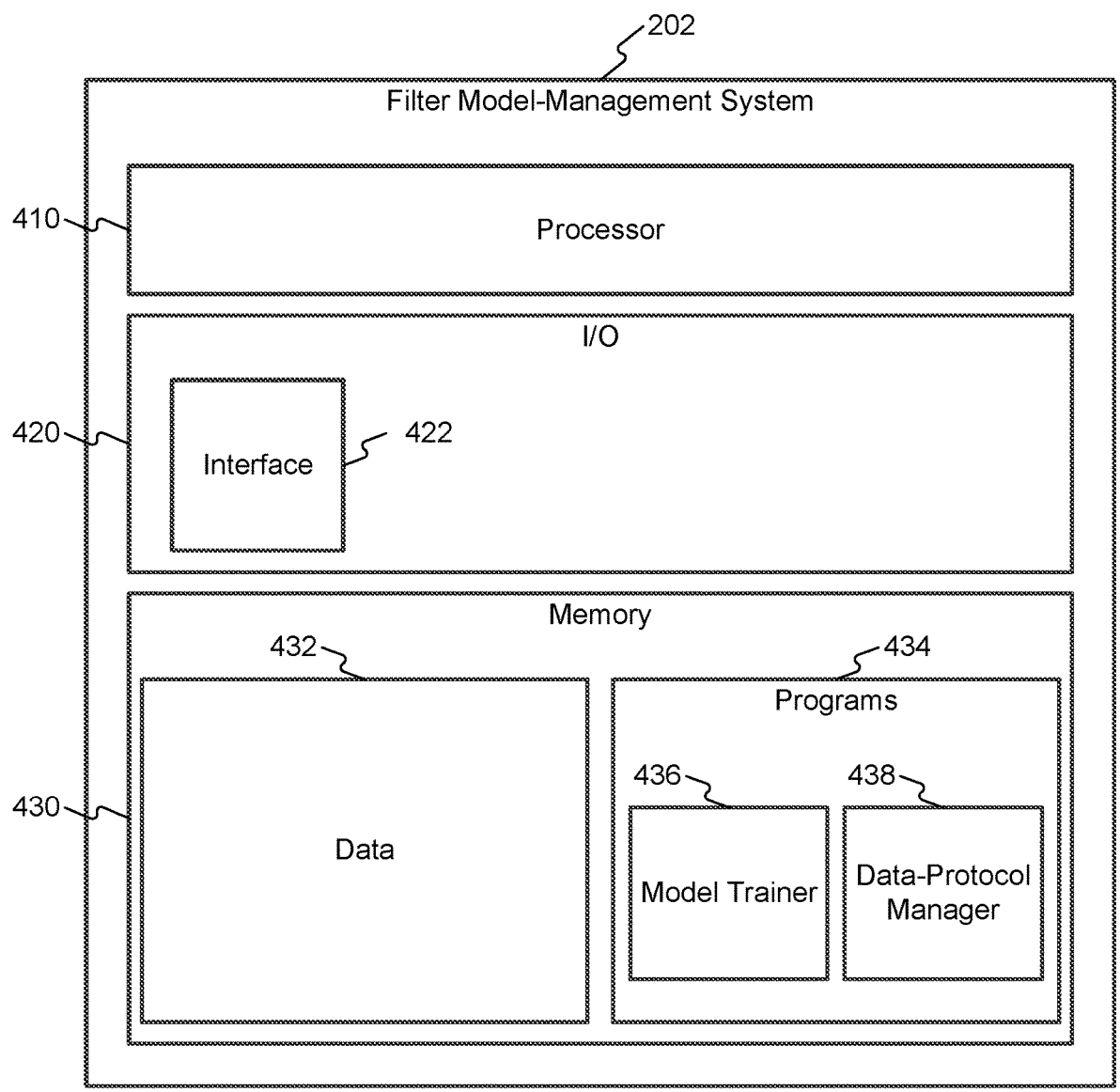
FIG. 4 is a block diagram of an exemplary model-management system, consistent with disclosed embodiments.

FIG. 4 is a block diagram of exemplary filter model-management system 202, consistent with disclosed embodiments. As shown, filter model-management system 202 may include one or more processors 410 embedded in computing entities, such as computers, servers, server clusters, and/or a cloud services, consistent with disclosed embodiments; one or more I/O devices 420; and one or more memory units 430. In some embodiments, some or all components of filter model-management system 202 may be hosted on a computer, a server, a cluster of servers, or a cloud service. In some embodiments, filter model-management system 202 may be a scalable system configured to efficiently manage resources and enhance security by provisioning computing resources in response to triggering events and terminating resources after completing a task (e.g., a scalable cloud service that spins up and terminates container instances).

FIG. 4 depicts an exemplary configuration of filter model-management system 202. As will be appreciated by one skilled in the art, the components and arrangement of components included in filter model-management system 202 may vary. For example, as compared to the depiction in FIG. 4, filter model-management system 202 may include a larger or smaller number of processors, I/O devices, or memory units. In addition, filter model-management system 202 may further include other components or devices not depicted that perform or assist in the performance of one or more processes consistent with the disclosed embodiments. The components and arrangements shown in FIG. 4 are not intended to limit the disclosed embodiments, as the components used to implement the disclosed processes and features may vary.

Processor 410 may comprise known computing processors, including a microprocessor. Processor 410 may be implemented as a single-core or multiple-core processor that executes parallel processes simultaneously. For example, processor 410 may be a single-core processor configured with virtual processing technologies. In some embodiments, processor 410 may use logical processors to simultaneously execute and control multiple processes. Processor 410 may implement virtual machine technologies, or other known technologies to provide the ability to execute, control, run, manipulate, store, etc., multiple software processes, applications, programs, etc. In other embodiments, processor 410 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 410 may execute various instructions stored in memory 430 to perform various functions of the disclosed embodiments described in greater detail below. Processor 410 may be configured to execute functions written in one or more known programming languages.

I/O devices 420 may include at least one of a display, an LED, a router, a touchscreen, a keyboard, a microphone, a speaker, a haptic device, a camera, a button, a dial, a switch, a knob, a transceiver, an input device, an output device, or other I/O device to perform methods of the disclosed embodiments. I/O devices 420 may be components of an interface 422 (e.g., a user interface).

Interface 422 may be configured to manage interactions between system 200 and other systems using network 212. In some aspects, interface 422 may be configured to publish data received from other components of system 200. This data may be published in a publication and subscription framework (e.g., using APACHE KAFKA), through a network socket, in response to queries from other systems, or using other known methods. Data may be synthetic data, as described herein. As an additional example, interface 422 may be configured to provide information received from other components of system 200 regarding datasets. In various aspects, interface 422 may be configured to provide data or instructions received from other systems to components of system 200. For example, interface 422 may be configured to receive instructions for generating data models (e.g., type of data model, data model parameters, training data indicators, training parameters, or the like) from another system and provide this information to programs 434. As an additional example, interface 422 may be configured to receive data from another system (e.g., in a file, a an email message in a software application, application messages, notifications from services, VOIP call messages, or instant messages) and provide that data to programs 434 or store that data in, for example, data 432, model storage 104, dataset database 206, and/or remote database 208.

In some embodiments, interface 422 may include a user interface configured to receive user inputs and provide data to a user (e.g., a data manager). For example, interface 422 may include a display, a microphone, a speaker, a keyboard, a mouse, a track pad, a button, a dial, a knob, a printer, a light, an LED, a haptic feedback device, a touchscreen and/or other input or output devices.

Memory 430 may be a volatile or non-volatile, magnetic, semiconductor, optical, removable, non-removable, or other type of storage device or tangible (i.e., non-transitory) computer-readable medium, consistent with disclosed embodiments. As shown, memory 430 may include data 432, including one of at least one of encrypted data or unencrypted data. Consistent with disclosed embodiments, data 432 may include datasets, model data (e.g., model parameters, training criteria, performance metrics, model output, classification result), and/or any other data.

Data 432 and/or programs 434 may include a classification model, consistent with disclosed embodiments. A classification model may include a neural network model, an attention network model, a GAN model, an RNN model, a deep learning model (e.g., an LSTM model), a random forest model, a CNN model (e.g., INCEPTION by GOOGLE), an RNN-CNN model, an LSTM-CNN model, a temporal-CNN model, a support vector machine (SVM) model, a gradient boosting machine (GBM) model, a logistic regression model, a multiclass logistic regression model, and/or any other machine-learning model.

Data 432 and/or programs 434 may include a feature model, consistent with disclosed embodiments. A feature model may include a statistical model, an algorithm, and/or a machine learning model. A feature model may include an object detection model, an edge detection model, a corner detection model, a scale-invariant feature transformation algorithm (SIFT), a histogram of oriented gradients algorithm (HOG), a neural network model, a recurrent neural network (RNN) model, a deep learning model (e.g., an LSTM model), a random forest model, a CNN model, an RNN-CNN model, an LSTM-CNN model, a support vector machine (SVM) model, a natural-language model, and/or any other machine-learning model. A feature model may be configured to extract any data feature. For example, a feature model may be configured to extract color, texture, shape, motion, and location information from images (e.g., facial recognition to determine facial expression and/or eye targets focused on a computing device screen). A feature model may be configured to determine a statistical metric of data and/or machine-learned measure of data. A statistical metric may include a univariate statistical metric, a multivariate statistical metric, an average, a median, a range, a correlation, a regression result, a goodness of fit, and/or any other statistical metric. A feature model may be configured to generate summary statistics or summary descriptions of extracted features.

Data 432 and/or programs 434 may include a meta-model, consistent with disclosed embodiments. A meta-model may include a classification and/or regression-based meta model. A meta-model may include a neural network model, a deep-learning model, a CNN model, a long short-term memory (LSTM) model, a random forest model, a GBM model, and/or any other machine learning model. In some embodiments, meta-model 312 includes a regression model, a linear regression model, a logistic regression model, a multiclass logistic regression model, a polynomial regression model, a multivariate model, a stochastic model, and/or any other statistical model.

Programs 434 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 434 may be written in one or more programming or scripting languages. One or more of such software sections or modules of memory 430 may be integrated into a computer system, non-transitory computer-readable media, or existing communications software. Programs 434 may also be implemented or replicated as firmware or circuit logic.

Programs 434 may include a model trainer 436, a data-protocol manager 438, and/or other components (e.g., modules), not depicted, to perform methods of the disclosed embodiments. In some embodiments, modules of programs 434 may be configured to spin up one or more ephemeral container instances to perform a task and/or to assign a task to a running (warm) container instance, consistent with disclosed embodiments. Modules of programs 434 may be configured to receive, retrieve, and/or generate models, consistent with disclosed embodiments. Modules of programs 434 may be configured to perform operations in coordination with one another. In some embodiments, programs 434 may be configured to conduct an authentication process, consistent with disclosed embodiments.

Model trainer 436 may include algorithms to optimize machine-learning models. Model trainer 436 may include programs for optimizing parameters based on an objective function, such as a loss function, or other methods of optimizing model parameters. Model trainer 436 may be configured to perform hyperparameter tuning. In some embodiments, machine-learning models may include a neural network model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a natural-language model, and/or any other machine-learning model. Models may include an ensemble model (i.e., a model comprised of a plurality of models). Model trainer 436 may be configured to generate and/or train a classification model, consistent with disclosed embodiments. Model trainer 436 may be configured to generate and/or train a feature model, consistent with disclosed embodiments. Model trainer 436 may be configured to generate and/or train a meta-model, consistent with disclosed embodiments.

In some embodiments, training of a model may terminate when a training criterion is satisfied. A training criterion may include a number of epochs, a training time, a performance metric (e.g., an estimate of accuracy in reproducing test data, a loss function metric), or the like. Model trainer 436 may be configured to adjust model parameters during training. Model parameters may include weights, coefficients, offsets, or the like. Training may be supervised or unsupervised.

Data-protocol manager 438 may include algorithms to manage data collection protocols, such as data collection protocols used to collect data to generate classification results. Data-protocol manager 438 may include programs to generate and/or update applications or other packages (e.g., programs to generate and/or compile executable code). Data-protocol manager 438 may include programs for determining relationships between a data collection protocol and a classification result. Consistent with disclosed embodiments, data-protocol manager 438 may include models such as machine learning models and/or statistical models. Data-protocol manager 438 may be configured to generate and/or update a data collection protocol based on device type (e.g., data-collection protocols based on a smartphone device type, a tablet device type, a computer device type, etc.).

Figure 5:
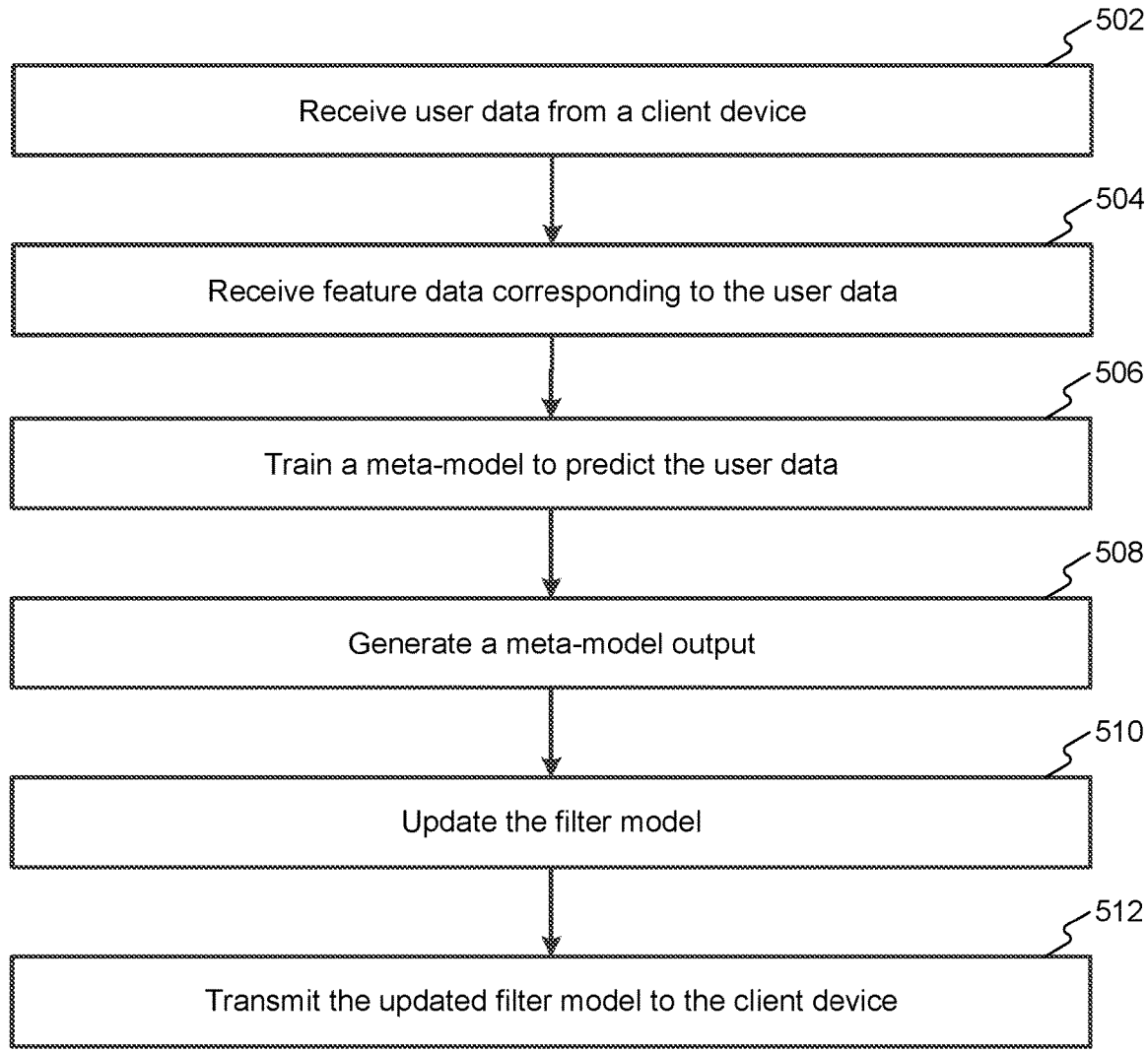
FIG. 5 is a flow chart of an exemplary process for processing user data, consistent with disclosed embodiments.

FIG. 5 is a flow chart of exemplary process 500 for processing user data, consistent with disclosed embodiments. In some embodiments, filter model-management system 202 may perform process 500 using programs 434 (FIG. 4). One or more of model trainer 436, data-protocol manager 438, and/or other components of programs 434 (FIG. 4) may perform operations of process 500, consistent with disclosed embodiments. It should be noted that other components of system 200 (FIG. 2), including, for example, one or more of client devices 204a, 204b,-204n may perform operations of one or more steps of process 500.

Consistent with disclosed embodiments, steps of process 500 may be performed on one or more cloud services using one or more ephemeral container instances. For example, at any of the steps of process 500, filter model-management system 202 may generate (spin up) an ephemeral container instance to execute a task, assign a task to an already-running ephemeral container instance ("warm" container instance), or terminate a container instance upon completion of a task. As one of skill in the art will appreciate, steps of process 500 may be performed as part of an application interface (API) call.

At step 502, filter model-management system 202 may receive from a sensor, user data associated with a client device, consistent with disclosed embodiments. User data may comprise incoming email or message-related data, computer usage/workflow data, facial recognition image data to determine a user's concentration level, or other identifying data or meta-data. Sensor data may include sensor data as discussed with respect to FIGS. 2-3 above. Filter model-management system 202 may receive user data from a component of system 200 and/or any other computing component. Filter model-management system 202 may retrieve user data from a data storage (e.g., data 432). User data at step 502 may include any type of user data as described herein and/or any other data. User data may include, for example, email data, workflow data, image data, string data, numeric data, or other data. User data may include labels, filtered data, filtered data, cluster data, metadata or the like. In some embodiments, user data may include email messaging content extracted from a plurality of received emails (as shown in FIG. 1). In some embodiments, filter model-management system 202 may filter or classify user data according to a threshold, wherein the threshold comprises at least one of an importance level or a priority level.

Filter model-management system 202 may allow for filtering user concentration levels by allowing user to "opt-in" to using model-management system 202 to manage workflows and notifications. Filter model-management system 202 may use sensors or inputs to analyze and describe the concentration level of the user. Sensor system 206 may analyze keyboard and typing cadence for a user, may analyze computer vision to determine a user facial expression, and may analyze eye focal targets on a screen or display of a computer or client device 204a, 204b,-204n. Filter model-management system 202 may also use natural language processing (NLP) to analyze emails being read or written by the user (as shown in FIG. 1) and may filter content by an importance level (as discussed below). Filter model-management system 202 may also analyze processor or computer (CPU) statistics to determine machine-task intensiveness of tasks or operations being performed and may analyze user-defined do-not-disturb statuses (such as when users are in meetings). As an example, in some embodiments, a user may receive daycare phone calls from his children while the user is at work, and may always accept such calls. Filter model-management system 202 may then recognize that the user always accepts daycare phone calls and will allow all such phone calls to be connected to the user (and may also provide a notification). Alternatively, in other embodiments, a user may receive pharmacy phone calls informing the user that a prescription is ready for pickup, and may always ignore such phone calls during meetings. Filter model-management system 202 may model this behavior and not provide any notification to the user of the pharmacy phone call because the user's pattern is to ignore the call. Filter model-management system 202 may also "learn" that automated calls may be ignored, based on associated metadata received with such calls. Other modeling techniques may be performed by filter model-management system 202 consistent with this disclosure.

At step 504, filter model-management system 202 may receive, from a filter model, feature data corresponding to the user data. Feature data may include workflow information, timestamps, email addresses, or other feature data (or data extracted from sensor system 206 as discussed above). Filter model-management system 202 may also generate or receive a feature model, consistent with disclosed embodiments. A feature model may include any feature model described herein and/or any other feature model. In some embodiments, generating a feature model includes generating seeds for model parameters. In some embodiments, generating a feature model includes receiving a feature model from a data storage and/or another computing component (e.g., data 231, client device 204n, third-party system 208, database 210). Filter model-management system 202 may receive additional feature data associated with the filter model and may train the meta-model (as discussed below), based on the additional feature data. Feature data may be associated with a feature model comprising at least one of an edge detection model or an object detection model. A feature model and a filter model may both comprise a convolutional neural network.

At step 506, filter model-management system 202 may train a meta-model to predict the user data based on the feature data, consistent with disclosed embodiments. Training at step 506 may include using feature data and may include any method of training as described herein and/or any other method of training a machine-learning model. Filter model-management system 202 may filter user data using the filter model; and may train the meta-model to predict the filtered first user data. The meta-model may comprise a deep-learning model or a statistical model. In some embodiments, filter model-management system 202 may train a meta-model to describe the priority level of any incoming email content, email message, or email notification. Filter model-management system 202 may also train a meta-model leverage NLP to analyze incoming email or workflow content to classify its importance level, recency, and relationship to other inquiries and/or email messages. Filter model-management system 202 may further train a meta-model to determine and compare an email urgency versus its importance, and to determine a relationship of an email message to the user (e.g. supervisory, VP+, subordinate relationship, and the like).

At step 508, filter model-management system 202 may generate a meta-model output based on the filter model and the feature data, consistent with disclosed embodiments. A meta-model output may include any model output described herein and/or any other output. In some embodiments, generating a meta-model output includes generating seeds for model parameters. In some embodiments, generating a meta-model output includes receiving filter model from a data storage, feature data, and/or another computing component (e.g., client device 204n, third-party system 208, database 210). In other embodiments, generating the meta-model output comprises identifying a relationship between the feature data and the filtered data. The relationship may include at least one of a correlation, a metric, or a regression result. In some embodiments, filter model-management system 202 may generate a meta-model output based on the trained meta model (as discussed above).

At step 510, filter model-management system 202 may update the filter model based on the meta-model output, consistent with disclosed embodiments. Updating at step 510 may include any method of training as described herein and/or any other method of updating a machine-learning model based on the meta-model output at step 510. Filter model-management system 202 may generating a performance metric based on the meta-model output and may update the filter model by training the filter model based on a performance metric.

In some embodiments, filter model-management system 202 may update the filter model to analyze and score user's concentration level and analyze and score the incoming email content importance level. Filter model-management system 202 may then dynamically compare the user's concentration level to the incoming email content importance level and may determine whether the incoming content is sufficiently important and/or urgent to warrant interrupting the user with an incoming message and/or notification. In other embodiments, filter model-management system 202 may update the filter model to determine the optimal time to deliver incoming notifications and content to the user and to determine when a user will be most receptive to receiving incoming notifications in relation to the intensity of their current task. Filter model-management system 202 may also update the filter model to use machine learning to improve the accuracy and applicability of filter model-management system 200 over time.

At step 512, filter model-management system 202 may transmit the updated filter model to the client device, consistent with disclosed embodiments. A client device may be one of client devices 204a, 204b,-204n. The client device may be a mobile device, and the updated filter model may comprise a convolutional neural network, consistent with disclosed embodiments. Filter model-management system 202 may transmit the updated filter model using network 212 to client device 204a, 204b,-204n and by using any conventional packet or data transmission techniques.

Systems and methods disclosed herein involve unconventional improvements over conventional approaches to synthetic data generation. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for processing user data, the system comprising:
    a memory storing instructions; and
    at least one processor configured to execute the instructions to perform operations comprising:
        receiving, from a client device, first user data associated with a sensor, the sensor being associated with the client device, and the first user data comprising facial recognition image data;
        receiving, from a filter model of the client device, feature data corresponding to the first user data, the feature data comprising at least one of workflow information, system messages, or email addresses, and the filter model comprising at least one of a convolutional neural network, recurrent neural network, auto-encoder, or deep network;
        receiving, from the filter model, a data collection protocol comprising a command to wake a computing component and a data filter to reject or accept the feature data;
        training a meta-model to generate predicted second user data based on the feature data;

generating a meta-model output based on the filter model and the feature data, wherein generating the meta-model output comprises learning from a first data output of a filter model instance and a second data output of a feature model instance;

updating the filter model based on the meta-model output and factors associated with a filter model failure; and transmitting the updated filter model to the client device.

2. The system of claim 1, wherein:
the feature data is first feature data; and
the operations further comprise:
   receiving second feature data associated with the filter model; and
   training the meta-model, based on the second feature data.

3. The system of claim 2, wherein the second feature data further comprises at least one of application messages, notifications from services, VOIP call messages, or instant messages.

4. The system of claim 1, wherein the operations further comprise classifying first user data according to a threshold, the threshold comprising at least one of an importance level or a priority level.

5. The system of claim 1, wherein:
the operations further comprise filtering the first user data using the filter model; and
training the meta-model comprises training the meta-model to predict the filtered first user data.

6. The system of claim 5, wherein generating the meta-model output comprises identifying a relationship between the feature data and the filtered first user data.

7. The system of claim 6, wherein the relationship comprises at least one of a correlation, a metric, or a regression result.

8. The system of claim 1, wherein:
the operations comprise generating a performance metric based on the meta-model output; and
updating the filter model comprises training the filter model based on a performance metric.

9. The system of claim 1, wherein the meta-model comprises a deep-learning model.

10. The system of claim 1, wherein the feature data is associated with a feature model comprising at least one of an edge detection model or an object detection model.

11. The system of claim 1, wherein the filter model comprises a convolutional neural network.

12. The system of claim 1, wherein the data collection protocol further comprises a command to adjust a hardware setting or change a data collection parameter.

13. A method for processing user data, comprising:
receiving, from a client device, first user data associated with a sensor, the sensor being associated with the client device, and the first user data comprising facial recognition image data;
receiving, from a filter model of the client device, feature data corresponding to the first user data, the feature data comprising at least one of workflow information, system messages, or email addresses, and the filter model comprising at least one of a convolutional neural network, recurrent neural network, auto-encoder, or deep network;
receiving, from the filter model, a data collection protocol comprising a command to wake a computing component and a data filter to reject or accept the feature data;
training a meta-model to generate predicted second user data based on the feature data;
generating a meta-model output based on the filter model and the feature data, wherein generating the meta-model output comprises learning from a first data output of a filter model instance and a second data output of a feature model instance;
updating the filter model based on the meta-model output and factors associated with a filter model failure; and
transmitting the updated filter model to the client device.

14. The method of claim 13, wherein
the feature data is first feature data; and
the method further comprises:
   receiving second feature data associated with the filter model; and
   training the meta-model, based on the second feature data.

15. The method of claim 14, wherein the second feature data further comprises at least one of application messages, notifications from services, VOIP call messages, or instant messages.

16. The method of claim 13, further comprising classifying first user data according to a threshold, the threshold comprising at least one of an importance level or a priority level.

17. The method of claim 13, further comprising:
filtering the first user data using the filter model; and
training the meta-model comprises training the meta-model to predict the filtered first user data.

18. A non-transitory computer-readable medium storing instructions that, when executed by a processor, cause the processor to perform operations comprising:
receiving, from a client device, first user data associated with a sensor, the sensor being associated with the client device, and the first user data comprising facial recognition data;
receiving, from a filter model of the client device, feature data corresponding to the first user data, the feature data comprising at least one of workflow information, system messages, or email addresses, and the filter model comprising at least one of a convolutional neural network, recurrent neural network, auto-encoder, or deep network;
receiving, from the filter model, a data collection protocol comprising a command to wake up a computing component and a data filter to reject or accept the feature data;
training a meta-model to generate predicted second user data based on the feature data;
generating a meta-model output based on the filter model and the feature data, wherein generating the meta-model output comprises learning from a first data output of a filter model instance and a second data output of a feature model instance;
updating the filter model based on the meta-model output and factors associated with a filter model failure; and
transmitting the updated filter model to the client device.

* * * * *